(12) United States Patent
Kyeong et al.

(10) Patent No.: US 11,894,196 B2
(45) Date of Patent: Feb. 6, 2024

(54) MULTILAYER CERAMIC CAPACITOR

(71) Applicant: SAMSUNG ELECTRO-MECHANICS CO., LTD., Suwon-si (KR)

(72) Inventors: San Kyeong, Suwon-si (KR); Young Soo Yi, Suwon-si (KR); Kun Ho Koo, Suwon-si (KR); Soung Jin Kim, Suwon-si (KR); Ho Yeol Lee, Suwon-si (KR); Kyung Ryul Lee, Suwon-si (KR); Chang Hak Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 59 days.

(21) Appl. No.: 17/833,165

(22) Filed: Jun. 6, 2022

(65) Prior Publication Data

US 2023/0187137 A1    Jun. 15, 2023

(30) Foreign Application Priority Data

Dec. 10, 2021 (KR) ........................ 10-2021-0176657

(51) Int. Cl.
*H01G 4/232* (2006.01)
*H01G 4/30* (2006.01)

(52) U.S. Cl.
CPC ............ *H01G 4/2325* (2013.01); *H01G 4/30* (2013.01)

(58) Field of Classification Search
None
See application file for complete search history.

(56) References Cited

U.S. PATENT DOCUMENTS

| 10,026,556 | B2 * | 7/2018 | Ando | H01G 4/232 |
| 10,249,436 | B2 * | 4/2019 | Kayatani | H01G 4/008 |
| 11,152,154 | B2 * | 10/2021 | Nagai | H01G 4/248 |
| 11,264,171 | B2 * | 3/2022 | Nagai | H01G 4/2325 |
| 2016/0351332 | A1 * | 12/2016 | Lee | H01G 4/232 |

(Continued)

FOREIGN PATENT DOCUMENTS

| JP | 10-022164 A |   | 1/1998 |   |
| JP | 2001210545 A | * | 8/2001 | ........... H01G 4/2325 |

(Continued)

*Primary Examiner* — Dion R. Ferguson
(74) *Attorney, Agent, or Firm* — MORGAN, LEWIS & BOCKIUS LLP

(57) ABSTRACT

A multilayer ceramic capacitor includes a body including a dielectric layer and first and second internal electrodes stacked in a first direction and having first and second surfaces opposing each other in the first direction, third and fourth surfaces opposing each other in a second direction, and fifth and sixth surfaces opposing each other in a third direction, and first and second external electrodes disposed on the third and fourth surfaces of the body, respectively, and connected to the first and second internal electrodes, respectively. The first and second external electrodes each include a central portion disposed in a center of each of the third and fourth surfaces and an outer portion disposed outside the central portion. $T1 > T2 > T3$, in which $T1$ and $T3$ are maximum value and minimum value of a thickness of the central portion, respectively, and $T2$ is a maximum value of a thickness of the outer portion.

20 Claims, 6 Drawing Sheets

(56) References Cited

U.S. PATENT DOCUMENTS

| | | | | |
|---|---|---|---|---|
| 2017/0352485 A1* | 12/2017 | Kayatani | ................ | H01G 4/232 |
| 2017/0352487 A1* | 12/2017 | Kayatani | ................ | H01G 4/30 |
| 2018/0082793 A1 | 3/2018 | Satoh et al. | | |
| 2020/0211774 A1* | 7/2020 | Onodera | ................ | H01G 4/248 |
| 2020/0211775 A1* | 7/2020 | Onodera | ................ | H01G 4/012 |
| 2023/0187137 A1* | 6/2023 | Kyeong | ................ | H01G 4/2325 |
| | | | | 361/321.2 |
| 2023/0187138 A1* | 6/2023 | Park | ................ | H01G 4/232 |
| | | | | 361/301.4 |
| 2023/0215628 A1* | 7/2023 | Jung | ................ | H01G 4/12 |
| | | | | 361/301.4 |

FOREIGN PATENT DOCUMENTS

| | | | | | |
|---|---|---|---|---|---|
| JP | 3604040 | B2 * | 12/2004 | | |
| JP | 2010161352 | A * | 7/2010 | | |
| JP | 2018-046228 | A | 3/2018 | | |
| JP | 2019046914 | A * | 3/2019 | ............ | H01G 4/012 |
| JP | 2021-027053 | A | 2/2021 | | |
| JP | 7052259 | B2 * | 4/2022 | ............ | H01G 4/005 |
| JP | 2023044006 | A * | 3/2023 | ............ | H01G 4/012 |

* cited by examiner

MULTILAYER CERAMIC CAPACITOR

CROSS-REFERENCE TO RELATED APPLICATION (S)

This application claims benefit of priority to Korean Patent Application No. 10-2021-0176657 filed on Dec. 10, 2021 in the Korean Intellectual Property Office, the disclosure of which is incorporated herein by reference in its entirety.

TECHNICAL FIELD

The present disclosure relates to a multilayer ceramic capacitor.

BACKGROUND

Multilayer ceramic capacitors (MLCCs) are important chip components used in devices produced in industries such as the communications, computing, home appliance, automobile, and other industries. Due to advantages such as compactness, guaranteed high capacitance, and ease of mounting, MLCCs are core passive elements used in various electric, electronic and information communication devices such as mobile phones, computers, digital TVs, and the like.

In line with demand for compactness and high capacitance of MLCCs, external electrodes of MLCCs have also been thinned.

In the related art, external electrodes are formed by preparing a paste for external electrodes by mixing a conductive metal with glass, a dispersant, an organic solvent, and the like, dipping both ends of a ceramic body into the paste for external electrodes, and then sintering the same.

However, when the external electrodes are formed by the dipping method, it may be difficult to form external electrodes having a uniform thickness due to viscosity and surface energy of the paste for external electrodes, and the external electrode formed on an outer portion of the body may be thinner than the center of the external electrode, degrading corner coverage performance.

In addition, since the external electrode formed at the outer portion of the body is formed to be thin, external substances such as moisture may easily penetrate thereto, which is a major cause of deterioration of product quality due to deterioration of moisture resistance reliability.

SUMMARY

Exemplary embodiments prevent a phenomenon in which corner coverage performance is degraded as external electrodes are formed to be thin at an outer portion of a multilayer ceramic capacitor.

Exemplary embodiments prevent a degradation of moisture resistance reliability of a multilayer ceramic capacitor due to penetration of external substances such as moisture.

According to an aspect of the present disclosure, a multilayer ceramic capacitor includes: a body including a dielectric layer and first and second internal electrodes disposed to be stacked in a first direction with the dielectric layer interposed therebetween and having first and second surfaces opposing each other in the first direction, third and fourth surfaces opposing each other in a second direction, and fifth and sixth surfaces opposing each other in a third direction; and first and second external electrodes disposed on the third and fourth surfaces of the body, respectively, and connected to the first and second internal electrodes, respectively. The first and second external electrodes each include a central portion disposed in a center of each of the third and fourth surfaces and an outer portion disposed outside the central portion, and $T1>T2>T3$ in which $T1$ is a maximum value of a thickness of the central portion, $T2$ is a maximum value of a thickness of the outer portion, and $T3$ is a minimum value of the thickness of the central portion.

According to another aspect of the present disclosure, a multilayer ceramic capacitor includes: a body including a dielectric layer and first and second internal electrodes disposed to be stacked in a first direction with the dielectric layer interposed therebetween and having first and second surfaces opposing each other in the first direction, third and fourth surfaces opposing each other in a second direction, and fifth and sixth surfaces opposing each other in a third direction; and first and second external electrodes disposed on the third and fourth surfaces, respectively, and connected to the first and second internal electrodes, respectively. The first and second external electrodes each include a central portion disposed in a center of each of the third and fourth surfaces and an outer portion disposed outside the central portion, the central portion and the outer portion are convex in the second direction and a boundary region between the central portion and the outer portion are concave in the second direction.

According to another aspect of the present disclosure, a multilayer ceramic capacitor includes: a body including a dielectric layer and first and second internal electrodes with the dielectric layer interposed therebetween; and first and second external electrodes disposed on the body, and connected to the first and second internal electrodes, respectively. One of the first and second external electrodes includes at least three convex portions including a conductive metal and glass.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
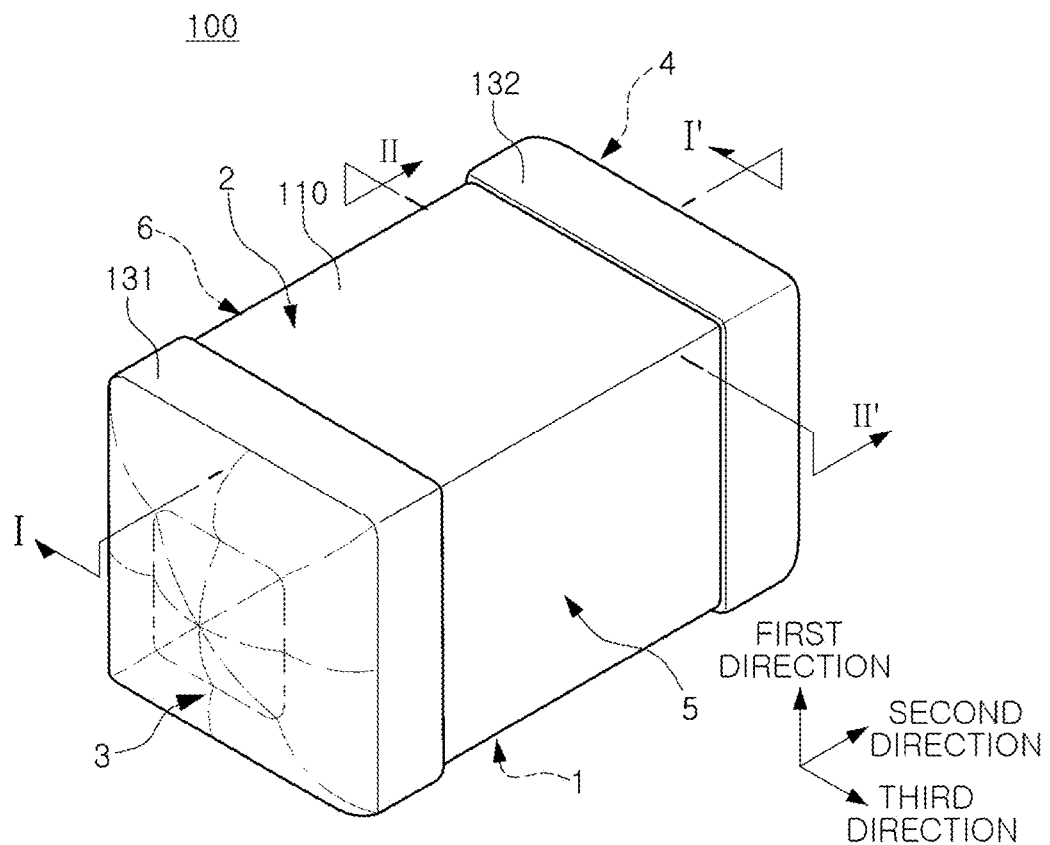
FIG. 1 is a perspective view schematically illustrating a multilayer ceramic capacitor according to an exemplary embodiment in the present disclosure.
Figure 2:
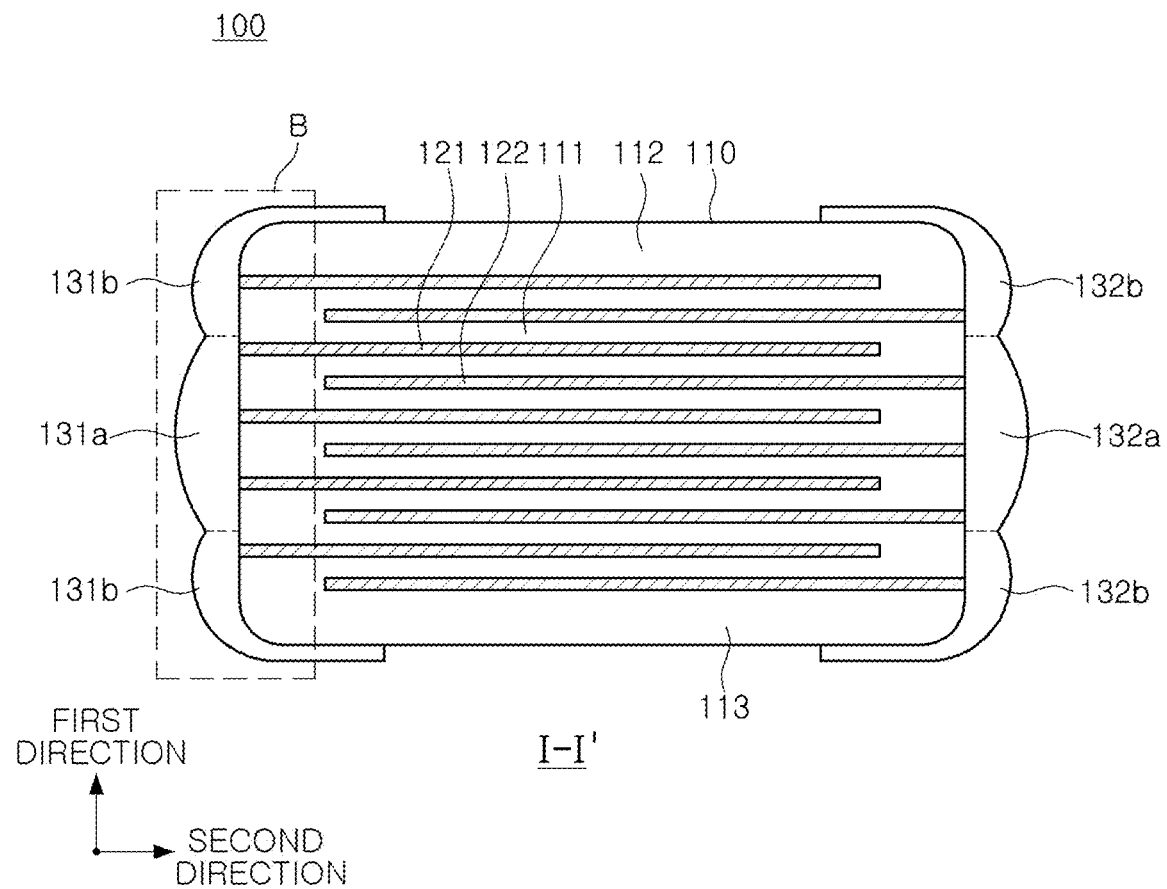
FIG. 2 is a cross-sectional view taken along line I-I' of FIG. 1.

Hereinafter, exemplary embodiments of the present inventive concept will be described in detail with reference to the accompanying drawings. The inventive concept may, however, be exemplified in many different forms and should not be construed as being limited to the specific exemplary embodiments set forth herein. Rather, these exemplary embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

To clarify the present disclosure, portions irrespective of description are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings. Throughout the specification, unless explicitly described to the contrary, the word "comprise" and variations such as "comprises" or "comprising", will be understood to imply the inclusion of stated elements but not the exclusion of any other elements.

In the drawings, a first direction may be defined as a stacking direction or a thickness (T) direction, a second direction may be defined as a length (L) direction, and a third direction may be defined as a width (W) direction.

Hereinafter, a multilayer ceramic capacitor according to an exemplary embodiment in the present disclosure will be described in detail with reference to FIGS. 1 to 4.

An exemplary embodiment of the present disclosure provides a multilayer ceramic capacitor 100 including a body including a dielectric layer 111 and first and second internal electrodes 121 and 122 disposed to be stacked with the dielectric layer 111 interposed therebetween in a first direction and having first and second surfaces 1 and 2 opposing each other in the first direction, third and fourth surfaces 3 and 4 opposing each other in a second direction, and fifth and sixth surfaces 5 and 6 opposing each other in a third direction; and first and second external electrodes 131 and 132 disposed on the third and fourth surfaces 3 and 4 of the body, respectively, and connected to the first and second internal electrodes 121 and 122, respectively. The first and second external electrodes 131 and 132 each include central portions 131a and 132a disposed in the centers of the third and fourth surfaces 3 and 4 and outer portions 131b and 132b disposed outside the central portions 131a and 132a, and T1>T2>T3 in which T1 is a maximum value of a thickness of the central portions 131a and 132a, T2 is a maximum value of a thickness of the outer portions 131b and 132b, and T3 is a minimum value of the thickness of the central portions 131a and 132a.

There is no particular limitation to a specific shape of the body 110 but, as illustrated, the body 110 may have a hexahedral shape or a shape similar thereto. Due to shrinkage of ceramic powder particles included in the body 110 or polishing of corner portions during a sintering process, the body 110 may have substantially a hexahedral shape, not a hexahedral shape with perfectly straight lines.

A plurality of dielectric layers 111 forming the body 110 are in a sintered state, and adjacent dielectric layers 111 may be integrated such that boundaries therebetween may not be readily apparent without using a scanning electron microscope (SEM).

A material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder, and an example of the ceramic powder may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ obtained by partially dissolving calcium (Ca), zirconium (Zr), and the like in $BaTiO_3$.

Here, an average thickness of the dielectric layers 111 may be changed according to a capacitance design of the multilayer ceramic capacitor 100. A thickness of a single layer may be configured to be 0.1 to 10 μm after sintering in consideration of the size and capacitance of the body 110, and may be 0.4 μm for miniaturization and high capacitance of the multilayer ceramic capacitor 100, but the present disclosure is not limited thereto.

The body 110 may include a capacitance forming portion A in which a plurality of first and second internal electrodes 121 and 122 are stacked, and cover portions 112 and 113 formed on upper and lower surfaces of the capacitance forming portion A. The upper cover portion 112 and the lower cover portion 113 may be formed by stacking a single dielectric layer or two or more dielectric layers on upper and lower surfaces of the capacitance forming portion A in the first direction, respectively, and may serve to prevent damage to the internal electrodes due to physical or chemical stress. The upper and lower cover portions 112 and 113 may have the same material and configuration as those of the dielectric layer 111 of the capacitance forming portion A, except that the upper and lower cover portions 112 and 113 do not include internal electrodes.

Figure 3:
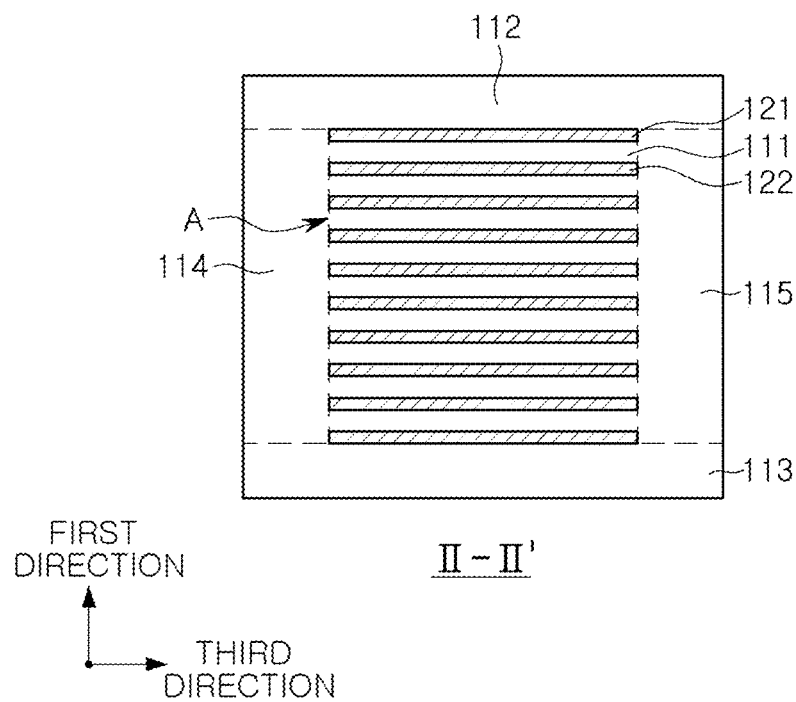
FIG. 3 is a cross-sectional view taken along line II-II' of FIG. 1.
Figure 4:
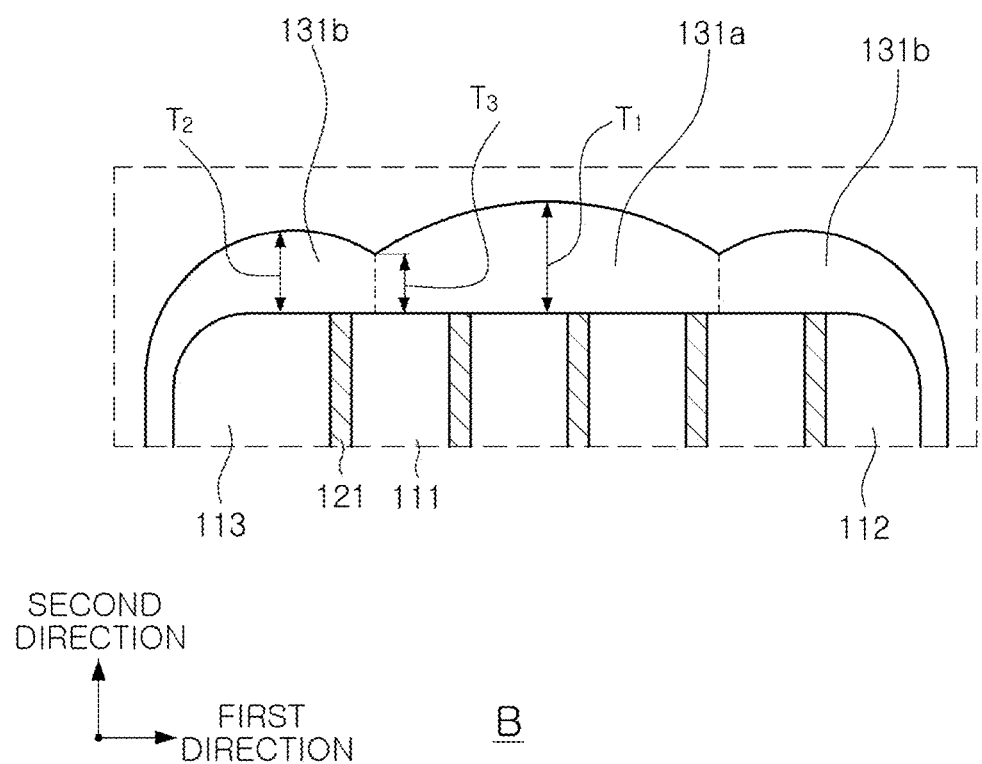
FIG. 4 is an enlarged view of an enlarged region B of FIG. 2.

In addition, margin portions 114 and 115 may be disposed on side surfaces of the capacitance forming portion A, respectively. That is, the margin portions 114 and 115 may be disposed on the fifth and sixth surfaces 5 and 6, both side surfaces of the body 110, in the third direction, respectively. As shown in FIG. 3, the margin portions 114 and 115 refer to regions between both ends of the internal electrodes 121 and 122 and a boundary of the body 110 in a cross-section taken in the first and third directions. The margin portions 114 and 115 may basically serve to prevent damage to the internal electrodes due to physical or chemical stress.

The margin portions 114 and 115 may be formed as the internal electrodes are formed by applying a conductive paste on a ceramic green sheet excluding regions in which the margin portions are to be formed. In addition, in order to suppress a step difference due to the internal electrodes 121 and 122, the margin portions 114 and 115 may be formed by cutting the internal electrodes 121 and 122 to be exposed to the fifth and sixth surfaces 5 and 6 of the body after stacking and subsequently stacking a single dielectric layer or two or more dielectric layers on both side surfaces of the capacitance forming portion A in the third direction.

The first and second internal electrodes 121 and 122 are a pair of electrodes having different polarities, and may be alternately exposed through the third and fourth surfaces 3 and 4 of the body 110 in the stacking direction with the dielectric layer 111 interposed therebetween, and may be electrically insulated from each other by the dielectric layer 111 disposed therebetween.

The conductive metals included in the internal electrodes 121 and 122 may be one or more of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

The first and second external electrodes 131 and 132 may be disposed on the third and fourth surfaces 3 and 4 of the body 110 opposing each other, respectively, and the first and second external electrodes 131 and 132 may be connected to the first and second internal electrodes 121 and 122 on the third and fourth surfaces 3 and 4, respectively.

In this case, the external electrodes 131 and 132 may be sintered electrodes including a conductive metal and glass. The conductive metal may be, for example, one of silver (Ag), lead (Pb), platinum (Pt), nickel (Ni), and copper (Cu) or alloys thereof, but the present disclosure is limited thereto.

The glass fills an empty space when a metal component included in a paste for external electrodes forming the external electrodes 131 and 132 is shrunk during a sintering process and at the same time provide bonding strength between the external electrodes 131 and 132 and the body 110.

In addition, since the glass increases density of the external electrodes 131 and 132 to effectively suppress penetration of a plating solution and/or external moisture may be effectively suppressed, thereby improving the moisture resistance reliability of the multilayer ceramic capacitor 100.

The glass may have a composition in which oxides are mixed. The glass may be one or more selected from the group consisting of silicon oxide, boron oxide, aluminum oxide, a transition metal oxide, an alkali metal oxide and an alkaline earth metal oxide, but is not particularly limited.

The first and second external electrodes 131 and 132 may include central portions 131a and 132a disposed in the center of the third and fourth surfaces 3 and 4 of the body and outer portions 131b and 132b disposed outside the central portions 131a and 132a. T1>T2>T3, in which T1 is a maximum value of a thickness of the central portions 131a and 132a, T2 is a maximum value of a thickness of the outer portions 131b and 132b, and T3 is a minimum value of the thickness of the central portions 131a and 132a. Here, the thickness refers to a length in the second direction from the third and fourth surfaces 3 and 4 of the body 110 to which the internal electrodes 121 and 122 extend to outer surfaces of the external electrodes 131 and 132. Also, a region in which the thickness of the central portions 131a and 132a is minimized may be a boundary between the central portions 131a and 132a and the outer portions 131b and 132b.

T1 to T3 may be measured in at least one of cross-sections in the first and second directions and cross-sections in the second and third directions of the multilayer ceramic capacitor 100, and may be measured by analyzing an image of the cross-sections in the first and second directions and cross-sections in the second and third directions captured by an optical microscope (OM) or a scanning electron microscope (SEM), but the present disclosure is not limited thereto. Other methods and/or tools appreciated by one of ordinary skill in the art, even if not described in the present disclosure, may also be used.

In this case, the multilayer ceramic capacitor 100 according to an exemplary embodiment may satisfy T1>T2>T3 in at least one of the cross-sections in the first and second directions and the cross-sections in the second and third directions.

In the related art, the external electrodes 131 and 132 are formed by applying a paste for external electrodes to an external surface of the body 110 and then sintering the body, thus having a shape similar to that of a liquid drop. Accordingly, the central portions 131a and 132a of the external electrodes 131 and 132 are the thickest, and the thickness decreases toward the outer portions 131b and 132b.

As a result, corner coverage performance of the external electrodes 131 and 132 may be deteriorated, and external substances such as moisture may penetrate into the thin outer portions 131b and 132b, degrading the moisture resistance reliability of the multilayer ceramic capacitor 100.

Meanwhile, in the multilayer ceramic capacitor 100 according to the exemplary embodiment in the present disclosure, since T1>T2>T3 is satisfied, the corner coverage performance of the external electrodes 131 and 132 is improved, and a phenomenon in which external substances such as moisture penetrate into the outer portions 131b and 132b to degrade moisture resistance reliability of the multilayer ceramic capacitor 100 may be prevented.

In this case, a length of the central portions 131a and 132a in the first direction may be ¼ or more and ½ or less of the length of the first and second external electrodes 131 and 132 in the first direction, and a length of the central portions 131a and 132a in the third direction may be ¼ or more and ½ or less of the length of the first and second external electrodes 131 and 132 in the third direction.

In addition, a thickness of the outer portions 131b and 132b may increase from a boundary between the central portions 131a and 132a and the outer portions 131b and 132b toward a region in which a thickness of the outer portions 131b and 132b is maximum and may decrease to an outer side from the region in which the thickness of the outer portions 131b and 132b is maximum.

In an exemplary embodiment in the present disclosure, the ratio of T2 to T1 (T2/T1) may be 0.65 to 0.9. That is, the thickness of the outer portions 131b and 132b compared to the central portions 131a and 132a may be formed to be more than a certain level, so that the corner coverage may be improved and the moisture resistance reliability may be further improved, such as preventing penetration of external substances such as moisture.

If T2/T1 is less than 0.65, the corner coverage and moisture resistance reliability may be deteriorated, and it may be difficult to implement T2/T1 to exceed 0.9 in an actual product without a separate process.

T2 may be formed be a certain level or higher, compared with T1, to ensure the corner coverage and moisture resistance reliability, but may be, for example, 5 to 30 μm.

In an exemplary embodiment in the present disclosure, the outer portions 131b and 132b may cover the first and second internal electrodes 121 and 122 disposed outermost on the body 110. The outermost first and second internal electrodes 121 and 122 refer to internal electrodes 121 and 122 closest to the upper and lower cover portions 112 and 113, among the internal electrodes 121 and 122.

In particular, external substances such as moisture and a plating solution may penetrate through the inner electrodes 121 and 122 disposed at the outermost side. In the related art, a thickness of the external electrodes 131 and 132 covering the outermost internal electrodes 121 and 122 is thin, so that external substances such as moisture easily penetrate through the internal electrodes, thereby lowering the moisture resistance reliability of the multilayer ceramic capacitor 100.

Meanwhile, in the multilayer ceramic capacitor 100 according to the exemplary embodiment in the present disclosure, the outer portions 131b and 132b covering the outermost internal electrodes 121 and 122 are thick, so that penetration of external substances such as moisture may be effectively prevented, and thus the moisture resistance reliability of the multilayer ceramic capacitor 100 may be further improved.

According to an exemplary embodiment in the present disclosure, the outer portions 131b and 132b may be disposed to extend to a portion of the first surface, the second surface, the fifth surface, and the sixth surface 1, 2, 5, and 6 of the body 110. Accordingly, an occurrence of lifting at the interface between the ends of the external electrodes 131 and 132 and the body 110 may be suppressed and the moisture resistance reliability of the multilayer ceramic capacitor 100 may be improved.

Figure 5:
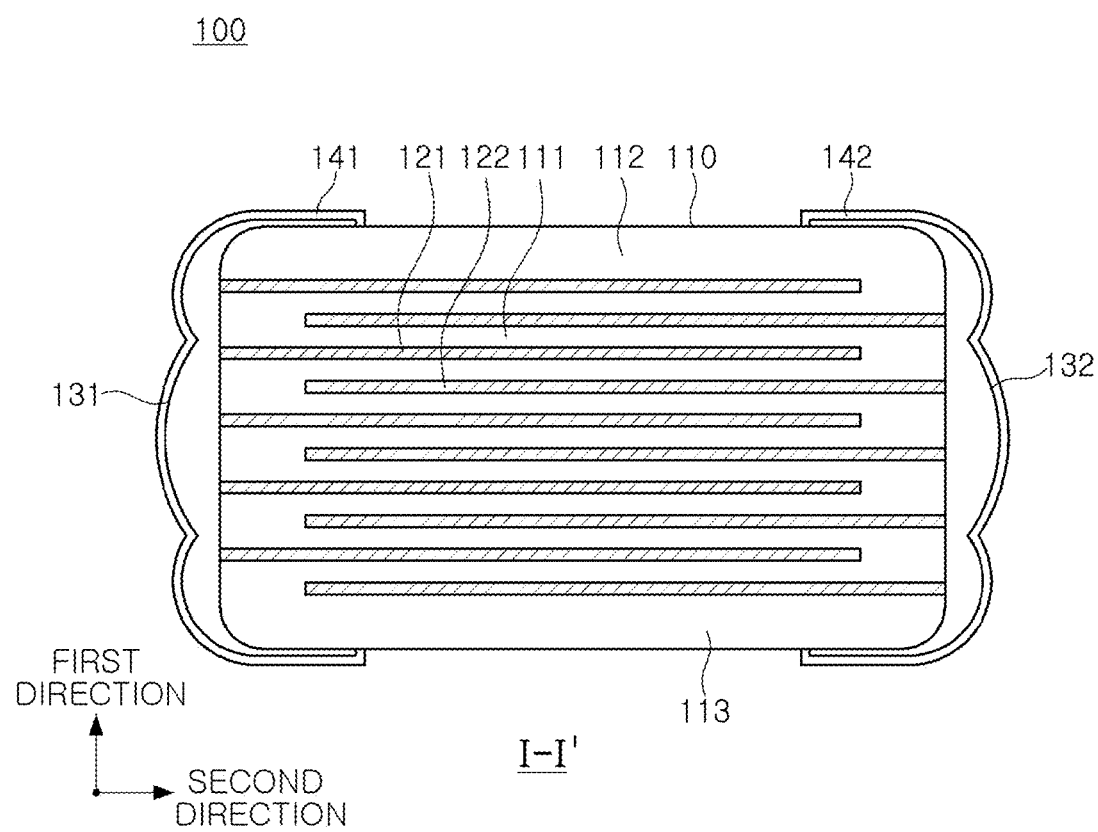
FIG. 5 is a cross-sectional view taken along line I-I' of FIG. 1 illustrating an exemplary embodiment in the present disclosure.

Referring to FIG. 5, the multilayer ceramic capacitor 100 according to an exemplary embodiment may further include plating layers 141 and 142 formed on the external electrodes 131 and 132. Specifically, the multilayer ceramic capacitor 100 may include a first plating layer 141 disposed on the first external electrode 131 and a second plating layer 142 disposed on the second external electrode 132. The plating layers 141 and 142 may serve to improve mounting characteristics of the multilayer ceramic capacitor 100.

The plating layers 141 and 142 may include at least one of Ni, Sn, Cu, Pd, and alloys thereof, and may include a plurality of layers. In particular, the plating layers 141 and 142 may include a nickel (Ni) plating layer and a tin (Sn) plating layer that are sequentially stacked on the external electrodes 131 and 132. The nickel plating layer may serve to prevent dissolution of solder when the multilayer ceramic capacitor 100 is mounted. The tin plating layer formed on the nickel plating layer may serve to improve solder wettability when the multilayer ceramic capacitor 100 is mounted.

Hereinafter, a multilayer ceramic capacitor according to another exemplary embodiment in the present disclosure will be described in detail.

A multilayer ceramic capacitor according to another exemplary embodiment in the present disclosure may include a body 110 including a dielectric layer 111 and first and second internal electrodes 121 and 122 disposed to be stacked in a first direction with the dielectric layer interposed therebetween and having first and second surfaces 1 and 2 opposing each other in the first direction, third and fourth surfaces 3 and 4 opposing each other in a second direction, and fifth and sixth surfaces 5 and 6 opposing each other in a third direction; and first and second external electrodes 131 and 132 disposed on the third and fourth surfaces 3 and 4, respectively, and connected to the first and second internal electrodes 121 and 122, respectively. The first and second external electrodes 131 and 132 include central portions 131a and 132a disposed in the centers of the third and fourth surfaces 3 and 4 and outer portions 131b and 132b disposed outside the central portions 131a and 132a, the central portions 131a and 132a and the outer portions 131b and 132b are convex in the second direction and a boundary region between the central portions 131a and 132a and the outer portions 131b and 132b are concave in the second direction.

In the multilayer ceramic capacitor 100 according to another exemplary embodiment in the present disclosure, the central portions 131a and 132a and the outer portions 131b and 132b may have a convex shape in the second direction, and the boundary region between the central portions 131a and 132a and the outer portions 131b and 132b may have a concave shape. That is, the multilayer ceramic capacitor 100 may include external electrodes 131 and 132 having three or more convex shapes on the third and fourth surfaces 3 and 4 of the body 110.

Accordingly, a thickness of the outer portions 131b and 132b may be thicker than that of the external electrodes 131 and 132 of the related art, thereby improving corner coverage performance and preventing penetration of external substances such as moisture, thereby further improving the moisture resistance reliability of the multilayer ceramic capacitor 100.

At this time, when a maximum value of the thickness of the central portions 131a and 132a is T1 and a maximum value of the thickness of the outer portions 131b and 132b is T2, the ratio of T2 to T1 (T2/T1) may be 00.65 to 0.9.

When the ratio of T2 to T1 (T2/T1) satisfies 0.65 to 0.9, the thickness of the outer portions 131b and 132b is formed to a certain level or greater, compared to the central portions 131a and 132a, so that the corner coverage may be improved and moisture resistance reliability may be further improved, such as preventing penetration of external substances such as moisture.

If the T2/T1 is less than 0.65, corner coverage and moisture resistance reliability may be reduced, and it may be difficult to implement the T2/T1 to exceed 0.9 without a separate process.

The multilayer ceramic capacitor 100 according to the other exemplary embodiment in the present disclosure may have the same configuration as that of the multilayer ceramic capacitor 100 according to the exemplary embodiment described above. Therefore, descriptions of the same components as those of the exemplary embodiment in the present disclosure described above will be omitted.

Hereinafter, a method of manufacturing a multilayer ceramic capacitor according to an exemplary embodiment in the present disclosure will be described in detail, but the present disclosure is not limited thereto. In describing the method of manufacturing a multilayer ceramic capacitor, descriptions overlapping those of the multilayer ceramic capacitor described above will be omitted.

In the method of manufacturing a multilayer ceramic capacitor according to an exemplary embodiment in the present disclosure, first, a slurry formed to include a powder such as barium titanate ($BaTiO_3$) is applied on a carrier film and dried to form a plurality of ceramic green sheets, thereby forming the dielectric layer 111 and the cover portions 112 and 113.

The ceramic green sheet is prepared by mixing ceramic powder, a binder, and a solvent to prepare a slurry and forming the slurry in a sheet form having a thickness of several μm by a doctor blade method or the like.

Next, a conductive paste for internal electrodes including a conductive metal such as nickel (Ni) is applied on the ceramic green sheet by a screen-printing method or a gravure printing method to form the internal electrodes 121 and 122.

Thereafter, a plurality of ceramic green sheets on which internal electrodes 121 and 122 are printed are stacked to form a ceramic stack, and a plurality of ceramic green sheets on which internal electrodes are not printed are stacked on upper and lower surfaces of the ceramic stack, which is then sintered to prepare the body 110. In this case, the internal electrodes 121 and 122 may be formed of first and second internal electrodes having different polarities.

Accordingly, the body 110 includes the dielectric layer 111, the first and second internal electrodes 121 and 122, and the cover portions 112 and 113. The dielectric layer 111 is formed by sintering a green sheet on which the internal electrodes 121 and 122 are printed, and the cover portions 112 and 113 are formed by sintering a green sheet on which the internal electrodes 121 and 122 are not printed.

Thereafter, the first external electrode 131 is formed on the third surface 3 of the body 110, and the second external electrode 132 is formed on the fourth surface 4. The external electrodes 131 and 132 may be formed by dipping the body 110 in a paste for external electrodes including a conductive metal such as copper (Cu), glass, a dispersant, and an organic solvent to apply the paste to the third and fourth surfaces 3 and 4 of the body 110, drying the paste-applied body, and then sintering the body 110.

The dispersant may include, for example, a nonionic surfactant, a cationic surfactant, an anionic surfactant, and the like, and may be used alone or in a combination of two or more thereof. In this case, when a paste for external electrodes having a relatively small dispersion characteristic is applied, diffusivity of the solvent inside the paste for external electrodes may be lowered. Accordingly, when the paste for external electrodes is dried, a diffusion rate of the internal solvent of the paste for external electrodes may be slow, compared to a volatilization rate of a solvent on an external surface of the paste for external electrodes. Accordingly, the first and second external electrodes 131 and 132 having a single convex shape are not formed on the entire third and fourth surfaces 3 and 4 of the body 110, but the central portions 131a and 132a may be formed in the center of the third and fourth surfaces 3 and 4 of the body 110 and having a convex shape and the outer portions 131b and 132b having a convex shape may be formed outside the central portions 131a and 132a. In addition, the external electrodes 131 and 132 in which a boundary region between the central portions 131a and 132a and the outer portions 131b and 132b is concave may be formed. Here, the thickness of the outer portions 131b and 132b is formed to a certain level or higher, compared to the central portions 131a and 132a, so that the moisture resistance reliability of the multilayer ceramic capacitor 100 may be improved.

The paste for external electrodes having relatively low dispersal properties may be formed by adding a dispersal agent having a relatively low dispersal ability, but the present disclosure is not limited thereto.

In addition, the method may further include forming the plating layers 141 and 142 on the external electrodes 131 and 132, for example, forming a nickel (Ni) plating layer on the external electrodes and forming a tin (Sn) plating layer on the nickel plating layer.

Figure 6:
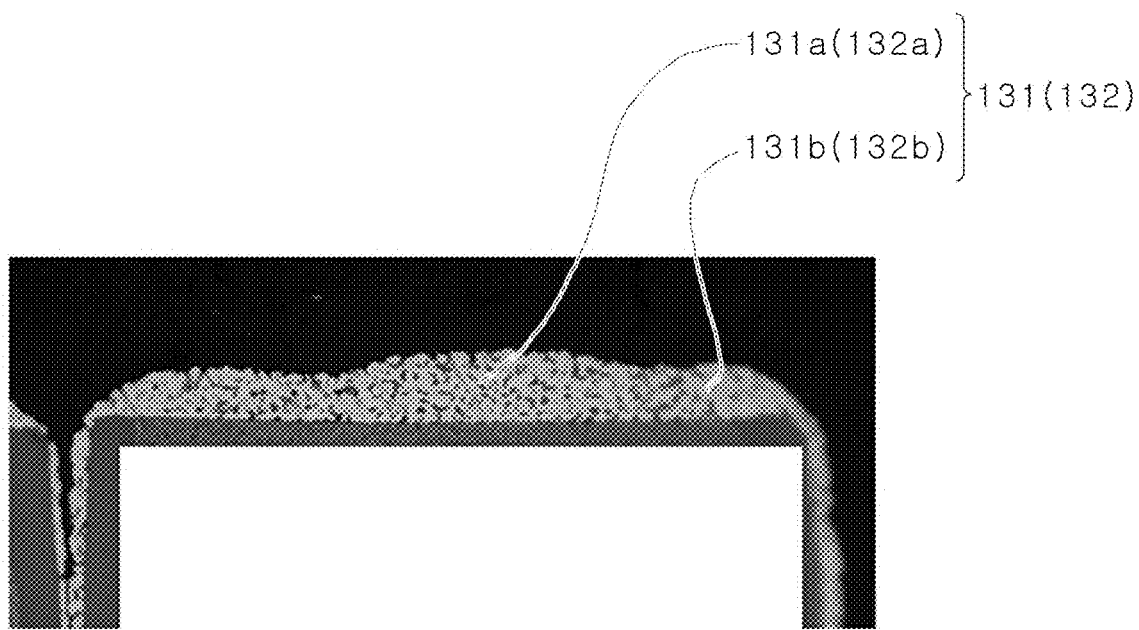
FIG. 6 is an image of an external electrode of a multilayer ceramic capacitor according to an exemplary embodiment in the present disclosure captured with an optical microscope.

FIG. 6 is an image of the external electrode of the multilayer ceramic capacitor according to the exemplary embodiment in the present disclosure captured with an optical microscope (OM). In particular, it is an image obtained by capturing a cross-section in the second direction and the third direction at a point at which the length of the multilayer ceramic capacitor in the first direction is half.

As shown in FIG. 6, the external electrodes 131 and 132 according to an exemplary embodiment in the present disclosure may include central portions 131a and 132a and outer portions 131b and 132b, and a maximum value of the thickness of the outer portions 131b and 132b may be greater than a minimum value of the thickness of the central portions 131a and 132a. In addition, the central portions 131a and 132a and the outer portions 131b and 132b may have a convex shape in the second direction, and the boundary region between the central portions 131a and 132a and the outer portions 131b and 132b may have a concave shape in the second direction.

As set forth above, one of various effects of the present disclosure is to improve corner coverage performance by forming a thickness of the external electrodes formed on the external surface of the body of the multilayer ceramic capacitor body to a certain level or greater.

One of the various effects of the present disclosure is to improve the moisture resistance reliability of the multilayer ceramic capacitor by forming the external electrodes capable of suppressing penetration of external substances such as moisture.

While example exemplary embodiments have been shown and described above, it will be apparent to those skilled in the art that modifications and variations could be made without departing from the scope of the present disclosure as defined by the appended claims.

What is claimed is:

1. A multilayer ceramic capacitor comprising:
a body including a dielectric layer and first and second internal electrodes disposed to be stacked in a first direction with the dielectric layer interposed therebetween and having first and second surfaces opposing each other in the first direction, third and fourth surfaces opposing each other in a second direction, and fifth and sixth surfaces opposing each other in a third direction; and
first and second external electrodes disposed on the third and fourth surfaces of the body, respectively, and connected to the first and second internal electrodes, respectively,
wherein the first and second external electrodes each include a central portion disposed in a center of each of the third and fourth surfaces and an outer portion disposed outside the central portion, and
T1>T2>T3 in which Ti is a maximum value of a thickness of the central portion, T2 is a maximum value of a thickness of the outer portion, and T3 is a minimum value of the thickness of the central portion.

2. The multilayer ceramic capacitor of claim 1, wherein a region in which the thickness of the central portion is minimal is a boundary between the central portion and the outer portion.

3. The multilayer ceramic capacitor of claim 1, wherein the thickness of the outer portion increases toward a region in which the thickness of the outer portion is maximal from a boundary between the central portion and the outer portion, and decreases toward the outside from the region in which the thickness of the outer portion is maximal.

4. The multilayer ceramic capacitor of claim 1, wherein T1>T2>T3 is satisfied in at least one of cross-sections in the first and second directions and cross-sections in the second and third directions.

5. The multilayer ceramic capacitor of claim 1, wherein a ratio of T2 to T1 (T2/T1) is 0.65 to 0.9.

6. The multilayer ceramic capacitor of claim 1, wherein the outer portions cover the first and second internal electrodes disposed on outermost portions of the body.

7. The multilayer ceramic capacitor of claim 1, wherein a length of the central portion in the first direction is ¼ to ½ of a length of the first and second external electrodes in the first direction.

8. The multilayer ceramic capacitor of claim 1, wherein a length of the central portion in the third direction is ¼ to ½ of a length of the first and second external electrodes in the third direction.

9. The multilayer ceramic capacitor of claim 1, wherein the outer portions extend to a portion of the first surface, the second surface, the fifth surface, and the sixth surface of the body.

10. The multilayer ceramic capacitor of claim 1, further comprising a plating layer disposed on the first and second external electrodes.

11. The multilayer ceramic capacitor of claim 1, wherein the first and second external electrodes include a conductive metal and glass.

12. A multilayer ceramic capacitor comprising:
a body including a dielectric layer and first and second internal electrodes disposed to be stacked in a first direction with the dielectric layer interposed therebetween and having first and second surfaces opposing each other in the first direction, third and fourth surfaces opposing each other in a 25 second direction, and fifth and sixth surfaces opposing each other in a third direction; and first and second external electrodes disposed on the third and fourth surfaces, respectively, and connected to the first and second internal electrodes, respectively, wherein the first and second external electrodes each include a central portion disposed in a center of each of the third and fourth surfaces and an outer portion disposed outside the central portion, the central portion and the outer portion are convex in the second direction and a boundary region between the central portion and the outer portion are concave in the second direction.

13. The multilayer ceramic capacitor of claim 12, wherein a ratio (T2/T1) of T2 to T1 is 0.54 to 0.9, in which T1 is a maximum value of a thickness of the central portion and T2 is a maximum value of a thickness of the outer portion in at least one of cross-sections in the first and second directions and cross-sections in the second and third directions.

14. The multilayer ceramic capacitor of claim 12, wherein the outer portion covers the first and second internal electrodes disposed on the outermost portions of the body.

15. The multilayer ceramic capacitor of claim 12, wherein a length of the central portion in the first direction is ¼ to ½ of a length of the first and second external electrodes in the first direction.

16. The multilayer ceramic capacitor of claim 12, wherein a length of the central portion in the third direction is ¼ to ½ of a length of the first and second external electrodes in the third direction.

17. The multilayer ceramic capacitor of claim 12, wherein the outer portions extend to a portion of the first surface, the second surface, the fifth surface, and the sixth surface of the body.

18. The multilayer ceramic capacitor of claim 12, further comprising a plating layer disposed on the first and second external electrodes.

19. The multilayer ceramic capacitor of claim 12, wherein the first and second external electrodes include a conductive metal and glass.

20. A multilayer ceramic capacitor comprising:
a body including a dielectric layer and first and second internal electrodes with the dielectric layer interposed therebetween; and
first and second external electrodes disposed on the body, and connected to the first and second internal electrodes, respectively,
wherein one of the first and second external electrodes includes at least three convex portions including a conductive metal and glass.

* * * * *